United States Patent [19]
Judkins

[11] Patent Number: 6,131,935
[45] Date of Patent: Oct. 17, 2000

[54] CYCLE RIDER FRONT TORSO SUPPORT

[76] Inventor: James H. Judkins, 9655 Glen Arbor, Ben Lomond, Calif. 95005

[21] Appl. No.: 09/145,116

[22] Filed: Sep. 1, 1998

[51] Int. Cl.[7] .................................................. B62K 19/40
[52] U.S. Cl. .......................... 280/290; 224/463; 224/413; 248/292.12; 74/528; 74/530; 74/553
[58] Field of Search ........................ 248/230.8, 229.17, 248/444, 447, 292.12; 74/527, 528, 553, 530, 531; 224/413, 416, 418, 463; 280/288.4, 290; 180/219, 218

[56] References Cited

U.S. PATENT DOCUMENTS

| | | | |
|---|---|---|---|
| 575,787 | 1/1897 | Voitek | 280/304.1 |
| 4,305,532 | 12/1981 | Reminger | 280/202 |
| 4,359,233 | 11/1982 | Jackson et al. | 224/463 |
| 4,466,660 | 8/1984 | Mabie | 297/195 |
| 4,469,301 | 9/1984 | Chevalier | 248/371 |
| 4,570,998 | 2/1986 | Hughes | 297/353 |
| 4,940,111 | 7/1990 | Nogami et al. | 180/219 |
| 4,953,911 | 9/1990 | Hanagan | 297/195 |
| 4,978,167 | 12/1990 | Harvey | 297/195 |
| 5,001,779 | 3/1991 | Eggert et al. | 224/463 |
| 5,326,122 | 7/1994 | Duffy | 280/288.4 |
| 5,383,677 | 1/1995 | Thomas et al. | 280/288.4 |

*Primary Examiner*—Brian L. Johnson
*Assistant Examiner*—Avraham H. Lerner
*Attorney, Agent, or Firm*—Henry M. Stanley

[57] ABSTRACT

An upper torso support for riders on vehicles such as motorcycles or bicycles has a padded surface for contact with the upper torso or the chest of a seated rider. The support is fixed to the vehicle framework and positioned forward of a vehicle seat. The angle of the support relative to the vehicle framework is adjustable to accommodate and provide support for riders of various statures.

11 Claims, 3 Drawing Sheets

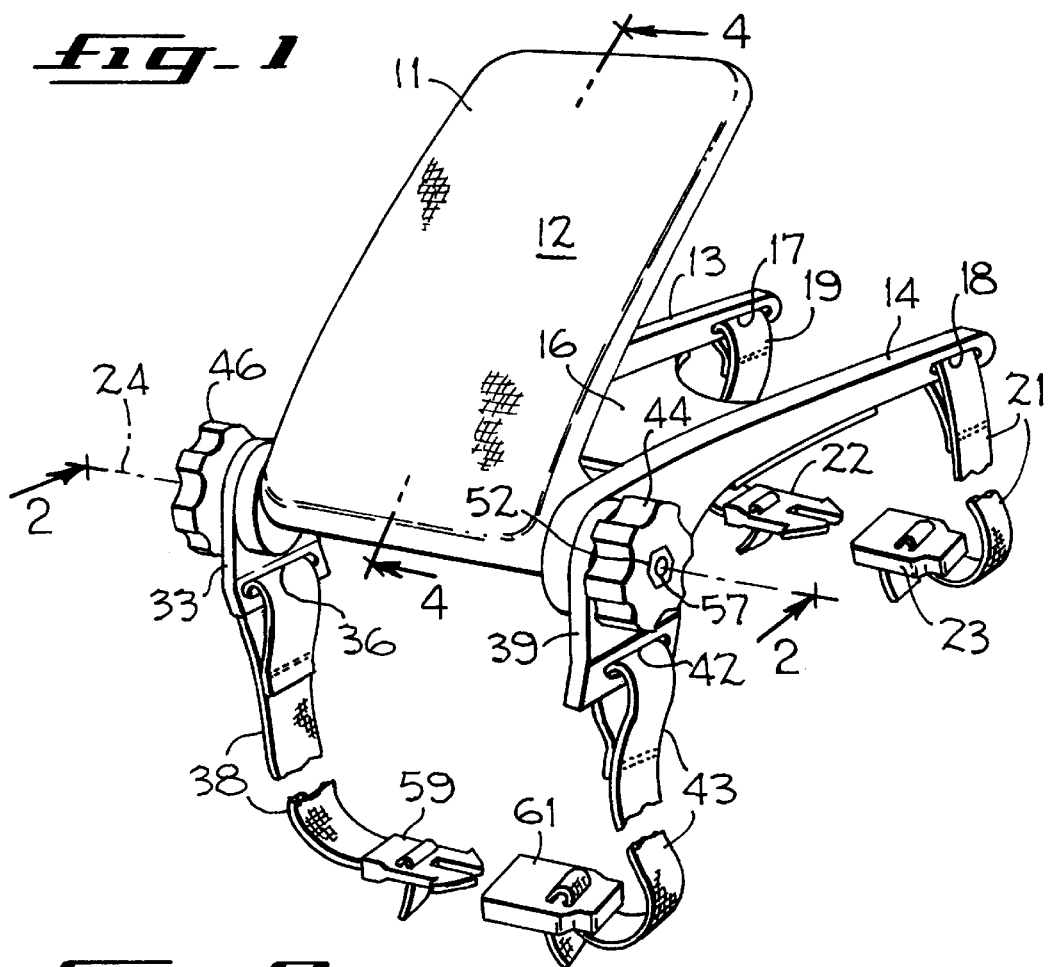
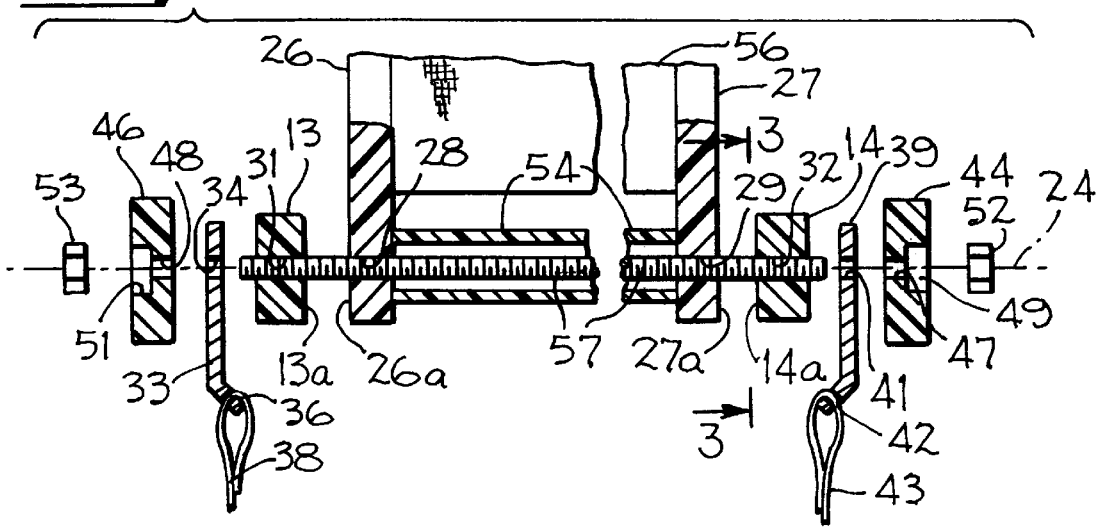

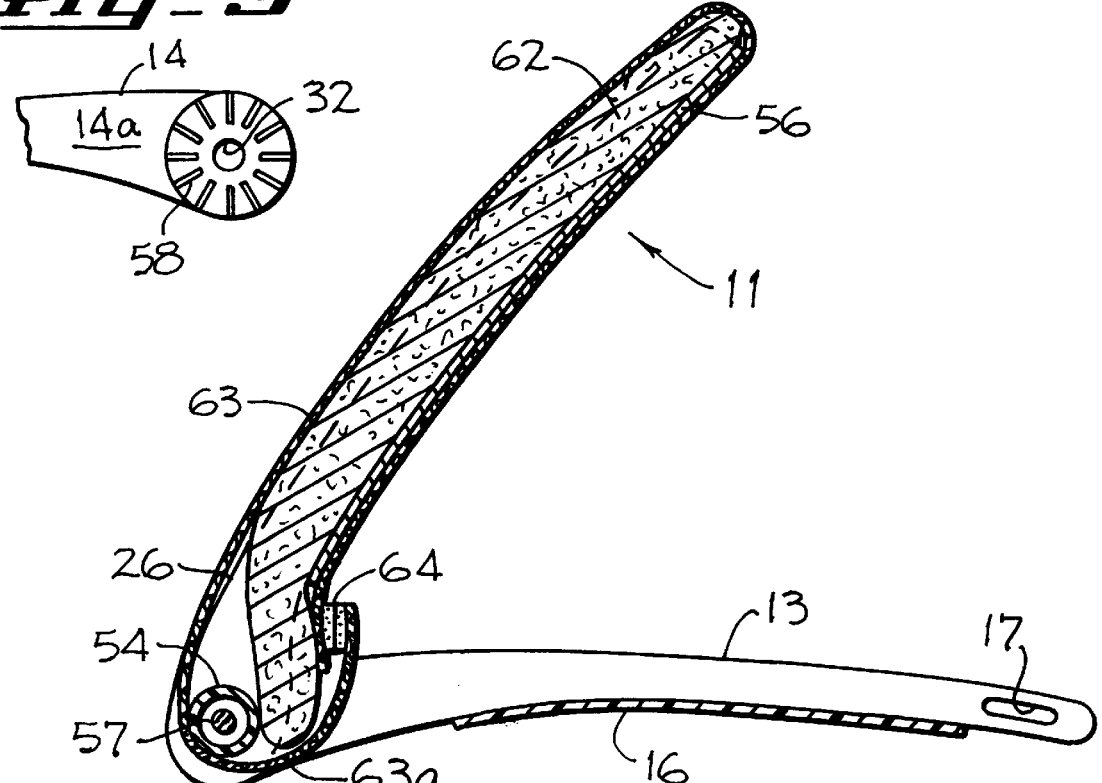
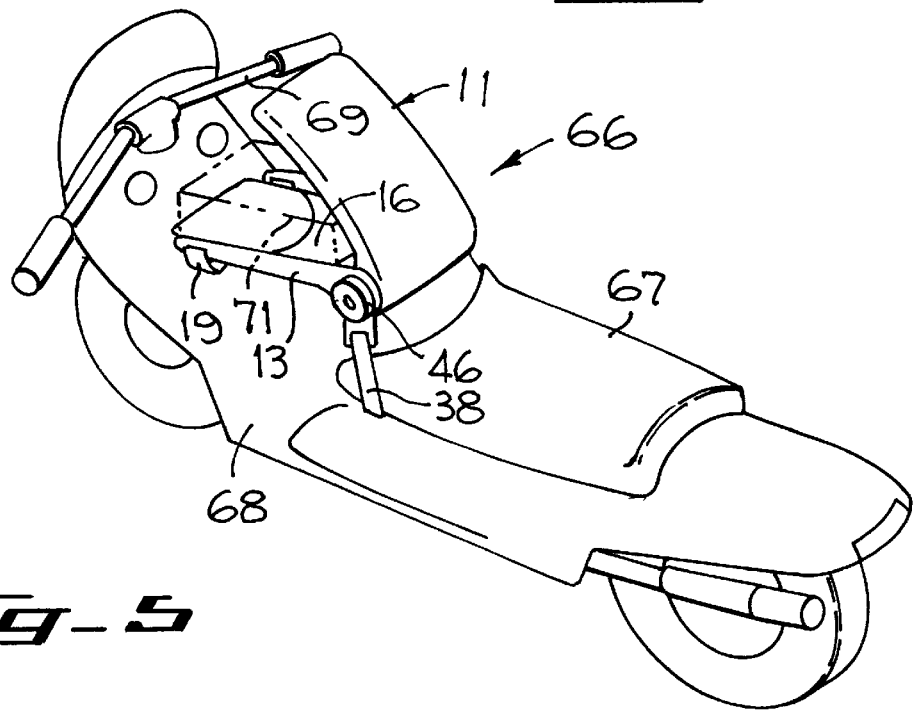

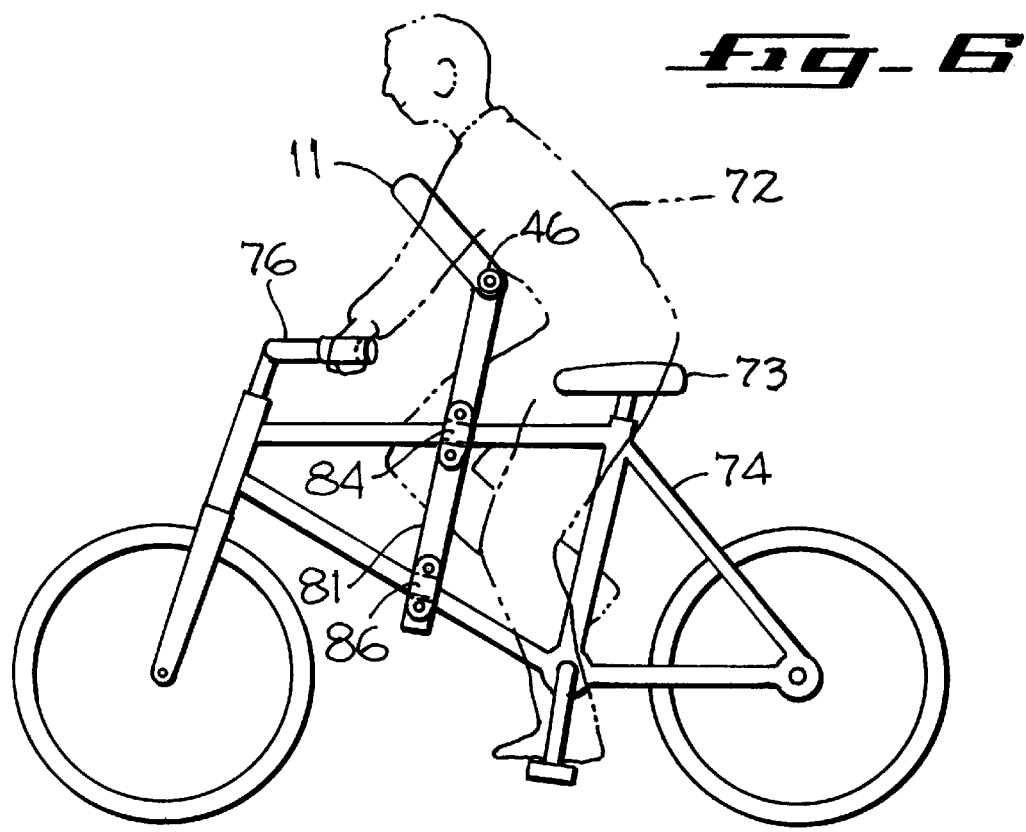
fig_6
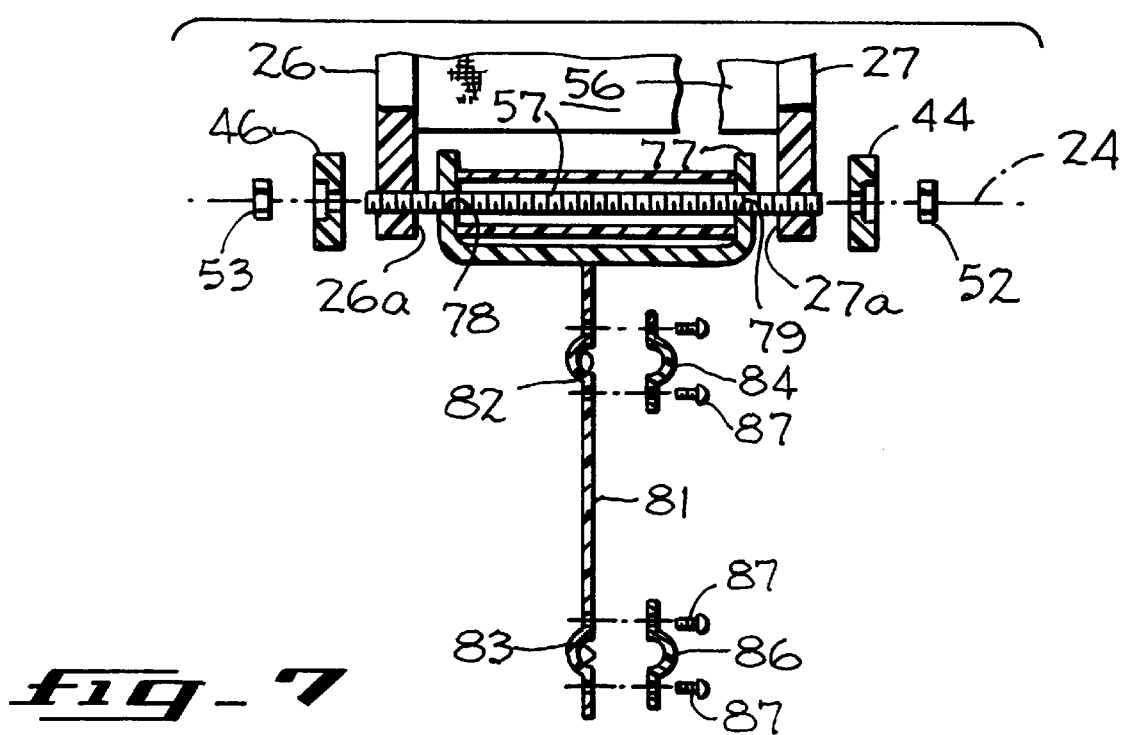
fig_7

CYCLE RIDER FRONT TORSO SUPPORT

SUMMARY OF THE INVENTION

A front leaning support is disclosed for a rider on a cycle having a framework, a rider's seat mounted thereon and forward mounted handlebars for steering. The support includes an upwardly extending torso support means and means for attaching the torso support means to the framework in a position forward of the rider's seat.

In another aspect of the invention, an upper body support for a rider on a cycle having a framework, a rider's seat mounted on the framework and forward located handlebars for cycle steering includes an upwardly and forwardly extending means for contacting and supporting a forward portion of the rider's upper body. The support engages the upper body at a forward angle relative to the framework. Means is fixed to the upwardly and forwardly extending means for attaching such means to the framework in a position forward of the rider's seat. Means is also included for adjusting the aforementioned forward angle.

In yet another aspect of the invention, an upper body support is disclosed for a rider occupying a seat mounted on a frame of a cycle having forward positioned handlebars for steering. The combination includes base means, means for fixing the base means to the frame and support means attached to the base means in a position forward of the seat. The support means extends upwardly from the base means at a predetermined angle relative thereto.

BRIEF DESCRIPTION OF THE DRAWINGS

FIG. 1 is a perspective of the front leaning support of the present invention.

FIG. 2 is a section along the line 2—2 of FIG. 1.

FIG. 3 is a view along the line 3—3 of FIG. 2.

FIG. 4 is a section along the line 4—4 of FIG. 1.

FIG. 5 is a perspective of the present invention in place on a motorcycle.

FIG. 6 is an elevation of the present invention in place on a bicycle.

FIG. 7 is an exploded view of a portion of the assembly described in connection with FIG. 6.

DESCRIPTION OF THE PREFERRED EMBODIMENTS

It is not uncommon for cycle riders, particularly motorcycle riders, to experience back and torso fatigue when riding for extended periods with their body inclined forwardly due to the necessity of leaning forward to engage the steering handlebars on a motorcycle. Numerous assemblies provide for back support in such instances, but support for riders with forward leaning torso positions is unknown to the inventor herein.

The term "cycle" as seen in the Figures herein and as described hereinafter refers to a two wheel vehicle having a framework and a seat and normally operated by a rider on the seat astride the framework.

The assembly of the present invention is shown in FIG. 1 having an upwardly extending torso or upper body support 11 having a broad flat surface 12 for contacting and supporting the upper torso of a motorcycle or bicycle rider as will be hereinafter explained. In the motorcycle version a pair of forward extending arms 13 and 14 have a spacer and stabilizing plate 16 fixed to and extending between the arms. The distal ends of the arms 13 and 14 have elongate slots 17 and 18 respectively cut therein as shown. The slot 17 has a webbing strap 19 passing therethrough and the slot 18 has a webbing strap 21 passing therethrough. The webbing straps 19 and 21 have fasteners such as are seen at 22 and 23 on the ends thereof for the purpose of fastening the webbing straps together after they are passed around a portion of a motorcycle framework to thereby fix the distal ends of the arms 13 and 14 in place relative to the framework. A pivot axis 24 extends through the proximal ends of the forwardly extending arms 13 and 14. The alignment of structure along the pivot axis 24 is best seen with reference to FIG. 2 of the drawings. A pair of upwardly and forwardly extending arms 26 and 27 is partially displayed in FIG. 2 and is contained within the upwardly and forwardly extending upper body and torso support 11 shown in FIG. 1. The arms 26 and 27 have holes 28 and 29, respectively, therethrough at the lower ends thereof (FIG. 2). The holes 28 and 29 are seen to lie along the pivot axis 24. The proximal ends of forward extending arms 13 and 14 are also shown in FIG. 2 having through-holes 31 and 32 with the axes of the holes also lying along the pivot axis 24. A metal straphanger 33 having a through-hole 34 therein is shown with the hole 34 along the pivot axis 24. The straphanger 33 has a slot 36 in the lower portion thereof through which is placed a webbing strap 38. On the opposing side of the assembly adjacent to the forward extending arm 14 is another metal straphanger 39 having a through-hole 41 also aligned with the pivot axis 24. The straphanger 39 also has a slot 42 in the lower portion thereof through which a webbing strap 43 is passed. A thumb knob 44 is positioned adjacent the straphanger 39 and another thumb knob 46 is positioned adjacent the straphanger 33. The thumb knobs 44 and 46 have through-holes 47 and 48, respectively, aligned along the pivot axis 24. Hexagonal counter bores 49 and 51 are also located in the thumb knobs 44 and 46 on the pivot axis. The hexagonal counter bores are configured to receive hexagonal nuts 52 and 53 as seen in FIG. 2, which have internal threads. A tubular spacer 54 extends between the inner surfaces of the upward and forwardly extending arms 26 and 27 seen in FIG. 2 for the purpose of resisting inward pressure at the lower ends of the arms. The arms 26 and 27 are also spaced and stabilized by a plate 56 that is fixed to and extends between them.

An elongate threaded rod 57 is shown in FIG. 2 lying along the pivot axis 24. The rod 57 is shown in a shortened view to clarify the exploded view of FIG. 2. The rod 57 actually extends along the entire pivot axis 24, engaging the nut 53 on one end and the nut 52 on the opposite end. A shortened view of the rod 57 allows the clearer depiction of the various through-holes lying along the pivot axis 24. The finished assembly has the rod 57 extending through the through-holes 28, 31, 34 and 48 on one end and through the through-holes 29, 32, 41 and 47 on the other end. The length of the rod 57 is sufficient to extend into the hexagonal counter bores 51 and 49 and to come into threaded engagement with the hexagonal nuts 52 and 53 placed therein. It may thus be seen that turning the thumb knobs 44 and 46 to cause the hexagonal nuts 52 and 53 to advance along the threaded length of the threaded rod 57 will provide inward pressure on the assembly arrayed along the pivot axis 24.

A radial gear array 58 is seen in FIG. 3 on the inside surface 14a of the forwardly extending arm 14. A matching radial gear array is formed on the outer surface 27a of the upwardly extending arm 27 to engage the radial gear 58 seen in FIG. 3. In like fashion a radial gear array is formed on the inside surface 13a of the forwardly extending arm 13 facing a matching radial gear array on the outer surface 26a of the upwardly extending arm 26. All of the gear arrays on the surfaces 13a, 26a, 27a and 14a surround the pivot axis 24. It may therefore be seen that when the thumb knobs 44 and 46 are turned to relieve the pressure along the pivot axis 24, the upwardly and forwardly extending arms 26 and 27 may be moved either toward a more vertical or a more horizontal position, thereby adjusting the angle between the upper body and torso support surface 12 and the forwardly extending arms 13 and 14.

It may be seen that the forward positioned straps 19 and 21 in FIG. 1 are attached to the distal ends of the arms 13 and 14, respectively, by sewn loops of the webbing strap. In like fashion, the webbing straps 38 and 43, which are drawn through the slots 36 and 42 and the strap supports 33 and 39 are secured to the strap supports by sewn loops in the webbing straps as seen in FIG. 1. The manner of securing the ends of the webbing straps 38 and 43 to each other or to portions of a motorcycle framework are not vital to the invention disclosed herein and are shown in FIG. 1 as being terminated in well-known mating plastic snap portions 59 and 61 similar to snap portions 22 and 23 described hereinbefore.

FIG. 4 shows the internal structure of the forwardly and upwardly extending upper body and torso support 11. The upwardly extending arm 26 is seen attached to the forwardly extending arm 13 at the pivot axis 24 along which the threaded rod 57 extends. The tubular spacer 54 is shown in place surrounding the threaded rod and the plate 56 is seen in section extending from the arm 26 toward the opposing arm 27. A piece of resilient padding 62 is set in place adjacent to the stabilizing and strengthening plate 56. The padding extends between the arms 26 and 27 as well as along the length of the arms and is terminated in the position shown adjacent the tubular spacer 54. A pliable bag 63 made of cloth, leather or some other flexible material, is drawn down over the upwardly and forwardly extending upper body and torso support having a flap 63a which is led under the tubular spacer and up to the opposite side of the lower portion of the bag. The flap 63a has a fastening means, such as Velcro (hook or loop) 64, at the end thereof, which mates with a like portion (loop or hook) on the lower end of the bag as shown in FIG. 4 to retain the covering for the upwardly extending support in place. As a result, the surface 12 (FIG. 1) of the upwardly extending torso support is soft and resilient and allows tolerable long-time contact between the torso and the support surface 12.

FIG. 5 shows the embodiment of the invention depicted in FIG. 1 assembled on a motorcycle at 66. The motorcycle has a seat 67 mounted on a framework covered by a fairing 68. A set of forwardly located handlebars 69 is utilized in the usual fashion to steer the motorcycle. The upper body and torso support having the upwardly extending support portion 11 is shown mounted to the motorcycle framework forward of the seat 67. The angle of the torso support portion 11 is set by adjustment of the thumb knobs 46 and 44 as described hereinbefore and the straps 38 and 43 are drawn underneath an appropriate portion of the motorcycle framework and secured at the snaps 59 and 61. Straps 19 and 21 at the distal ends of the forward extending arms 13 and 14 are likewise engaged with appropriate parts of the motorcycle framework and secured in place with the mating fasteners 22 and 23. With the front torso support secured in place on the motorcycle, there is a volume 71 shown in phantom line in FIG. 5, in which articles may be carried or stored during transit.

Turning to FIG. 6 of the drawings, the front torso and upper body support member 11 is shown in contact with the front upper body of a bicycle rider shown in phantom line at 72. The rider 72 is shown astride a bicycle having a seat 73, a framework 74, and a pair of forward located handlebars 76 for steering the bicycle. The embodiment of FIG. 6 differs from the embodiment of FIG. 1 only in the manner by which it is secured to the cycle framework. An exploded front elevation of the structure utilized in FIG. 6 is shown in FIG. 7. Upwardly extending arms 26 and 27 have the spacer and stabilizing plate 56 extending therebetween. Thumbnuts 44 and 46 are shown and are utilized in a fashion similar to that described hereinbefore for the embodiment of FIG. 1. Additionally, hex nuts 52 and 53 are utilized as shown in FIG. 7 and the radial gear array 58 of FIG. 3 is found on the inner surfaces 26a and 27a of the upwardly extending arms 26 and 27, respectively. A fork 77 has aligned holes 78 and 79 therethrough as seen in FIG. 7 lying along the pivot axis 24. The fork 77 is fixed to a downwardly extending member 81 having formed portions 82 and 83 therein for accepting portions of the bicycle frame 74. A clamp 84 cooperates with the formed portion 82 and another clamp 86 cooperates with the formed portion 83. When the clamps 84 and 86 are fastened to the member 81 by means of fasteners such as metal screws 87, the downwardly extending member 81 is secured to the bicycle frame 74 and the upwardly and forwardly extending torso support 11 is in position to provide support for the forward bending rider 72 seen in FIG. 6. The threaded member 57 extends along the pivot axis 24 in the embodiment of FIGS. 6 and 7 in the same manner in which it has been described with reference to FIG. 2, so that the upwardly extending torso support 11 is adjustable to obtain a predetermined angle relative to the frame 74 and to provide torso support at the front thereof for riders of various stature.

Although the best mode contemplated for carrying out the present invention has been shown and described herein, it will be understood that modification and variation may be made without departing from what is regarded to be the subject matter of the invention.

What is claimed:

1. A front leaning support for a rider on a cycle having a framework, a rider's seat mounted thereon and forward mounted handle bars for steering, comprising, upwardly extending torso support means, means for attaching said torso support means to the framework forward of the rider's seat, means for angularly adjusting said upwardly extending torso support means, whereby various rider statures are accommodated and a predetermined angle is set between said upwardly extending torso support means and the framework, and means for securing a storage article within said predetermined angle.

2. The front leaning support of claim 1, comprising padding on said upwardly extending torso support means.

3. A front leaning support for a rider on a cycle having a framework, a rider's seat mounted thereon and forward mounted handlebars for steering, comprising upwardly extending torso support means, and means for attaching said torso support means to the framework forward of the rider's seat, and wherein said means for attaching comprises a pair of forward extending arms fixed to said upwardly extending torso support means, and strap means for engaging portions of and attaching said pair of forward extending arms to the cycle framework.

4. The front leaning support of claim 3, comprising means for adjusting the angle between said upwardly extending torso support means and said pair of forward extending arms, whereby various rider statures are accommodated.

5. The front leaning support of claim 4 wherein said means for adjusting comprises pivot means having a pivot axis therethrough, radial gear means surrounding said pivot axis, and means for engaging and disengaging said radial gear means.

6. An upper body support for a rider on a cycle having a framework, a rider's seat mounted on the framework and forward located handlebars for cycle steering, comprising upwardly and forwardly extending means for contacting and supporting a forward portion of the rider's upper body at a forward angle relative to the framework, means pivotally secured to said upwardly and forwardly extending means for attaching said last named means to the framework for rotation about a pivot axis at a position forward of the rider's seat, opposing radial gear segments attached to said upwardly and forwardly extending means and said means pivotally secured thereto in position surrounding said pivot axis, and means for disengaging said gear segments to change said forward angle and for engaging said gear segments for fixing said forward angle.

7. The upper body support of claim 6 comprising padding on said means for contacting and supporting.

8. An upper body support for a rider on a cycle having a framework, a rider's seat mounted on the framework and forward located handlebars for cycle steering, comprising upwardly and forwardly extending means for contacting and supporting a forward portion of the rider's upper body at a forward angle relative to the framework, means fixed to said upwardly and forwardly extending means for attaching said last named means to the framework in a position forward of the rider's seat, and means for adjusting said forward angle, wherein said means for attaching comprises a forward extending member, and strap means attached to said forward extending member for engaging the framework.

9. An upper body front torso support for a rider occupying a seat on a frame of a cycle having forward positioned handlebars for steering, comprising base means, means for fixing said base means to the frame, support means attached to said base means in a position forward of the seat for contacting the upper body front torso, said support means extending upwardly at a predetermined angle relative thereto, and radial gear segments mounted in opposing positions on said base means and said support means, said radial gear segments being disposed alternatively in a separated pivoting mode and an engaged fixed mode, so that said predetermined angle is adjustable.

10. The upper body support of claim 9 wherein said support surface comprises a padded surface.

11. The upper body support of claim 14, further comprising means attached to said base means for securing a stored article within said predetermined angle.

* * * * *